United States Patent
Tsuchiya et al.

(10) Patent No.: US 7,038,980 B2
(45) Date of Patent: May 2, 2006

(54) OPTICAL DISK RECORDING APPARATUS AND OPTICAL DISK RECORDING METHOD

(75) Inventors: Satoshi Tsuchiya, Kanagawa (JP); Kazunori Takagi, Tokyo (JP)

(73) Assignee: Sony Corporation, (JP)

( * ) Notice: Subject to any disclaimer, the term of this patent is extended or adjusted under 35 U.S.C. 154(b) by 406 days.

(21) Appl. No.: 10/182,867

(22) PCT Filed: Dec. 5, 2001

(86) PCT No.: PCT/JP01/10619

§ 371 (c)(1),
(2), (4) Date: Oct. 8, 2002

(87) PCT Pub. No.: WO02/47073

PCT Pub. Date: Jun. 13, 2002

(65) Prior Publication Data

US 2003/0090975 A1    May 15, 2003

(30) Foreign Application Priority Data

Dec. 6, 2000    (JP) ............................ 2000-370856

(51) Int. Cl.
*G11B 7/08*    (2006.01)
(52) U.S. Cl. ................. 369/44.32; 369/53.18
(58) Field of Classification Search ............... 369/47.3, 369/53.37, 53.12, 47.11, 124.15, 53.18, 44.32
See application file for complete search history.

(56) References Cited

U.S. PATENT DOCUMENTS

| | | | | |
|---|---|---|---|---|
| 4,432,083 A | * | 2/1984 | Hsieh et al. | 369/44.11 |
| 4,752,843 A | * | 6/1988 | Kim | 360/75 |
| 5,101,396 A | * | 3/1992 | Takeuchi et al. | 369/116 |
| 5,105,413 A | * | 4/1992 | Bakx | 369/53.33 |
| 5,184,343 A | * | 2/1993 | Johann et al. | 369/53.15 |

(Continued)

FOREIGN PATENT DOCUMENTS

JP    59-22238 A1    2/1984

(Continued)

*Primary Examiner*—Brian E. Miller
*Assistant Examiner*—Michael V. Battaglia
(74) *Attorney, Agent, or Firm*—Lerner, David, Littenberg, Krumholz & Mentlik, LLP (57) ABSTRACT

According to the present invention, it is intended that the recording can be executed normally even against small vibrations to which a servo error signal detecting circuit cannot respond. A recording apparatus according to the present invention includes an optical head (12) for receiving a reflected laser beam (LREF) obtained when a laser beam (LIRR) is irradiated on a CD-R (10). This recording apparatus further includes a gate circuit (31) to which an output signal (SRD) of the optical head (12) is supplied and a level comparing circuit (34) for comparing a value of an output signal (DTAU) of this gate circuit (31) with a predetermined reference value (DTH). Upon recording, the gate circuit (31) is controlled in such a manner that a signal of a predetermined period $\tau$ may be outputted from the output signal (SRD) supplied from the optical head (12) to the gate circuit (31) as the output signal (DTAU). An output signal (SCMP) of the level comparing circuit (34) is outputted as a detected result of vibrations of the CD-R (10) or vibrations of the optical head (12).

4 Claims, 3 Drawing Sheets

U.S. PATENT DOCUMENTS

| | | | |
|---|---|---|---|
| 5,563,861 A | * 10/1996 | Kudo et al. | 369/53.12 |
| 5,568,458 A | * 10/1996 | Tani et al. | 369/44.35 |
| 5,708,639 A | 1/1998 | Iwanaga | |
| 5,737,481 A | * 4/1998 | Gushima et al. | 386/113 |
| 5,771,214 A | * 6/1998 | Saga | 369/44.29 |
| RE36,218 E | * 6/1999 | Maeda et al. | 369/47.33 |
| 6,181,653 B1 | * 1/2001 | Wada et al. | 369/47.33 |

FOREIGN PATENT DOCUMENTS

| | | |
|---|---|---|
| JP | 8-221911 A1 | 8/1996 |
| JP | 11-273077 A1 | 10/1999 |

* cited by examiner

FIG. 1

OPTICAL DISK RECORDING APPARATUS
AND OPTICAL DISK RECORDING METHOD

TECHNICAL FIELD

The present invention relates to a recording apparatus for and a recording method of recording a signal on a disk by using a laser beam.

BACKGROUND ART

Disks on which a signal can be recorded by using a laser beam are now available. A CD-R is known as one of such disks on which a signal can be recorded by using a laser beam. In this case, a CD-R is required to have read-out characteristics which are equivalent to those of a CD. Then, a CD is designed to record a signal by a combination of portions (called "lands") in which the amount of light of a reflected laser beam is increased when it is irradiated by a laser beam and portions (called "pits") in which the amount or light of a reflected laser beam is decreased when it is diffracted.

Therefore, the CD-R is provided with, as a recording layer, a dye layer having a high reflectance of a laser beam and which corresponds to the land. When this dye layer is irradiated by a laser beam, the dye layer generates heat from its point at which it is irradiated by a laser beam and thereby this point is deformed. This deformed portion has a reflectance lower than that of the dye layer and becomes a pit. Accordingly, the intensity of a laser beam is modulated by a recording signal, whereby the recording signal can be recorded on the CD-R.

In this case, however, since the dye layer produces intensive heat with the irradiation of the laser beam and thereby the recording signal can be recorded, the laser beam should be focused on the dye layer with high accuracy. Moreover, the position at which the CD-R is irradiated by the laser beam has to be prevented from being displaced from a track. However, when a CD-R or a recording and reproducing optical head (optical pickup) is vibrated, it is unavoidable that the properly-focused state of the laser beam is broken or that the track position (position irradiated by a laser beam) is displaced.

To solve this problem, a recording apparatus in actual practice is provided with a laser beam focusing and tracking servo system. Therefore, when vibrations to the CD-R or to the optical head are not so large, this servo system may respond to such vibrations to thereby control the optical head in such a manner that the optical head can escape from the influence exerted by such vibrations. Thus, a recording signal can be recorded on the disk normally. Further, when vibrations are so large that the optical head becomes unable to continue the recording, the recording made by the optical head is stopped for a moment. At the same time, when the vibrations are removed, if the recording is resumed from where the recording was stopped on the disk, then a recording signal can be recorded on the disk normally.

However, even when vibrations are small enough to cause the servo system to respond to such small vibrations normally, it is unavoidable that a laser beam is not properly focused or that a tracking error occurs due to the reasons which will follow. As a consequence, it is frequently observed that a recording signal cannot be recorded on the CD-R satisfactorily.

That is, the influences exerted upon the recording layer of the CD-R by vibrations generally exist in both of the focusing direction and the tracking direction. However, when the vibrations are displaced in one direction of either the focusing direction or the tracking direction, since the level of an error component (error component produced due to vibrations) contained in a focusing servo signal or a tracking servo signal reaches a certain level, the level of the error component can be detected and the recording can be stopped.

However, even when vibrations are of the same magnitude, if vibration components are dispersed into both of the focusing direction and the tracking direction, then individual vibration components become small with the result that error components (error components produced due to vibrations) contained in the focusing servo signal and the tracking servo signal reach very small values, respectively. In addition, a focusing error signal and a tracking error signal contain error components produced due to an eccentricity or disk skew of the CD-R.

For this reason, when the vibration components are dispersed into the focusing direction and the tracking direction, it is very difficult to detect the error components produced due to the vibrations. Therefore, there is a semblance as if the recording of the recording signal on the disk was ended normally.

As described above, even with such small vibrations, it is unavoidable that there occurs a slight displacement of a focus or a very small tracking error. As a result, the recording signal cannot be recorded on the CD-R satisfactorily.

Therefore, in order to cope with such situations, as is disclosed in a Japanese laid-open patent application No. 2000-90448, for example, it has so far been proposed that a recording apparatus be provided with a vibration detecting sensor capable of detecting the vibrations on the outside of the optical head and the CD-R. According to this method, however, since vibrations at the very portion that is performing a recording can not be necessarily being detected, vibrations which are harmful for the recording cannot always be detected, and a user tends to fail in the recording of the recording signal on the disk accordingly.

Then, in the case of a digital camera using a CD-R as a recording medium, when such digital camera fails to record an image signal, because the digital camera is unable to recapture the image signal to be recorded, there should be no excuse for failing in the recording.

On the other hand, when recording signals to be recorded on the CD-R are those obtained from other suitable media or equipment such as CDs or computers, even if a user fails in the recording, then a signal to be recorded on the disk can be obtained again, and hence a user is able to record the recording signal on the disk once more. However, until all recorded materials are played back thoroughly, a user is unable to determine whether or not the first recording has been made normally. Therefore, checking of whether or not the recording signal has been recorded on the disk normally takes a user a lot of time.

It is an object of the present invention to solve the aforementioned problems.

DISCLOSURE OF INVENTION

According to the present invention, there is provided a recording apparatus for recording a signal on a disk by irradiating a laser beam on the disk. This recording apparatus is comprised of a photoreceptor for receiving a reflected laser beam obtained when the laser beam is irradiated on the disk, a gate circuit to which a signal outputted from the photoreceptor is supplied and a level comparing circuit for comparing a value of the output signal from the gate circuit with a predetermined reference value, wherein upon recording, the gate circuit is controlled in synchronism with the signal to be recorded in such a manner that it may derive, as an output signal, a signal of a predetermined period from among the output signals supplied from the photoreceptor to the gate circuit and an output signal of the level comparing circuit is derived as a result of detecting vibrations of the disk or vibrations of a light source for outputting the laser beam.

Therefore, it can be detected based upon the detected result of the vibrations whether or not the pits are formed on the disk in actual practice.

BEST MODE FOR CARRYING OUT THE INVENTION

A best mode for carrying out the invention will be described below with reference to the drawings.

First, a relationship between a recording signal supplied to an optical pickup and a signal obtained from the optical pickup upon recording will be described with reference to FIG. 2.

Figure 2A:
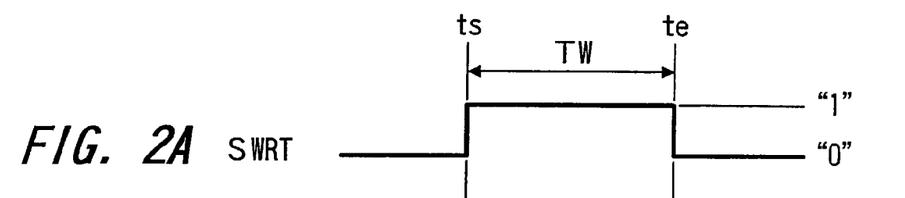
FIG. 2 is a diagram of waveforms for explaining the present invention.

FIG. 2A shows an example of a recording signal SWRT. This recording signal SWRT is an EFM signal the level of which takes two values of "0" and "1" and whose pulse width TW varies in response to recorded contents.

Figure 2B:
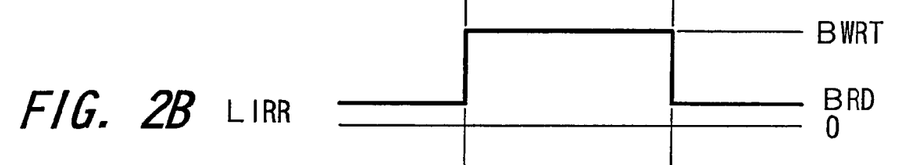

Then, a recording current is supplied to a laser diode of an optical head (optical pickup) in proportion to this recording signal SWRT, whereby the optical head outputs irradiated laser beam LIRR which corresponds to the recording signal SWRT and whose amount of light varies at a leading edge time ts and at a trailing edge time te of the recording signal SWRT as shown in FIG. 2B. However, at that time, since a direct current bias is added to the recording current that is supplied to the laser diode of the optical head, the amount of light of the irradiated laser beam LIRR from the laser diode is held at a predetermined value BRD even when the recording signal SWRT is held at low "0" level.

This predetermined value BRD has a magnitude to the extent that a recording signal cannot be recorded on the CD-R. This predetermined value is selected to be equal to the amount of light required when a signal is read out from the CD-R. The amount of light BWRT of the irradiated laser beam LIRR obtained when the recording signal SWRT is held at high "1" level is approximately 50 times, for example, as large as the amount of light BRD which is used to read out a signal from the disk.

Figures 2C, 2D:
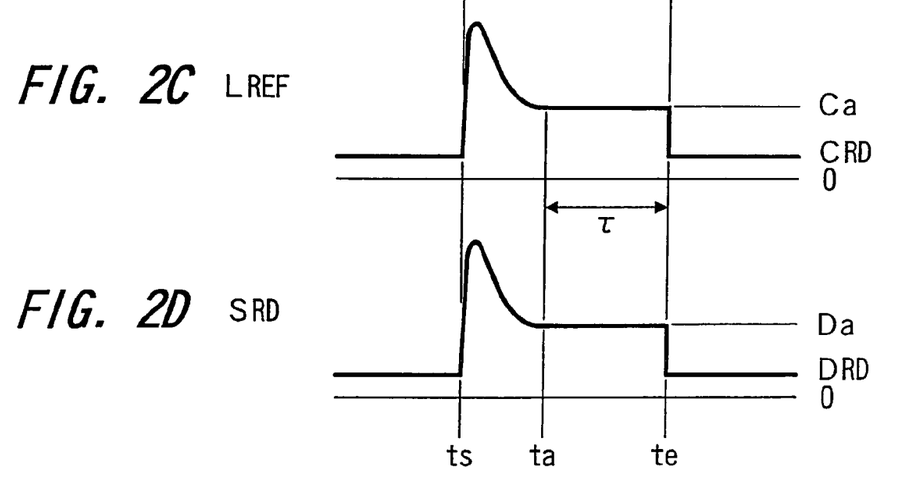

When the irradiated laser beam LIRR from this optical head is irradiated on a dye layer (recording layer) of the CD-R, part of the irradiated laser beam is reflected from the dye layer (recording layer) and reflected laser beam LREF is received by the same optical head. When a recording signal is recorded on the disk normally, the amount of light of the reflected laser beam LREF varies as shown in FIG. 2C. Specifically, since the amount of light of the irradiated laser beam LIRR is held at the small value BRD until the leading edge time ts of the recording signal SWRT, the amount of light of the reflected laser beam LREF is held at a small value CRD.

Then, when the recording signal SWRT rises up to high "1" level at the time ts, since the amount of light of the irradiated laser beam LIRR is held at the large value BWRT, the dye layer of the CD-R starts to produce heat from a point irradiated by the irradiated laser beam LIRR. However, since the irradiated point on the dye layer has yet to be deformed immediately after the time ts, the amount of light of the reflected laser beam LREF increases considerably in response to the amount of light BWRT of the irradiated laser beam LIRR and becomes maximum.

However, since the irradiated point on the dye layer of the CD-R starts to produce heat and begins to be deformed by irradiation of the irradiated laser beam LIRR, when this irradiated point on the dye layer is deformed, the amount of light of the reflected laser beam LREF decreases progressively. Then, at a certain time ta, the deformation of the irradiated point on the dye layer due to the produced heat reaches the limit with the result that the amount of light of the reflected laser beam LREF is continuously held at the value Ca after the time ta.

At the trailing edge time te of the recording signal SWRT, the amount of light of the irradiated laser beam LIRR is held at the small value BRD so that the amount of light of the reflected laser beam LREF is returned to the value CRD. Thereafter, the amount of light of that reflected laser beam is continuously held at the value CRD.

Then, since the reflected laser beam LREF varies as shown in FIG. 2C, the optical head produces an output signal SRD whose level DRD corresponds to the amount of light of the reflected laser beam LREF as shown in FIG. 2D. Specifically, because the amount of light of the reflected laser beam LREF is held at the value CRD before the leading edge time ts and after the trailing edge time te, the level of the output signal SRD also is held at the value DRD. The output signal SRD is held at the value DRD as described above even during the period in which the recording signal SWRT is held at low "0" level, and hence the focusing servo and the tracking servo required upon recording can be carried out by using this output signal.

During the period ranging from the time ts to the time ta, the level of the output signal SRD suddenly reaches the maximal value as the amount of light of the reflected laser beam LREF varies and is then gently lowered to the value Da. Then, the level of this output signal is held at substantially the value Da during the period ranging from the time ta to the time te (=τ).

Figure 3A:
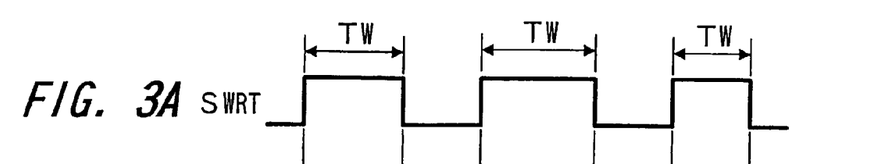
FIG. 3 is a diagram of waveforms for explaining the present invention.
Figure 3B:
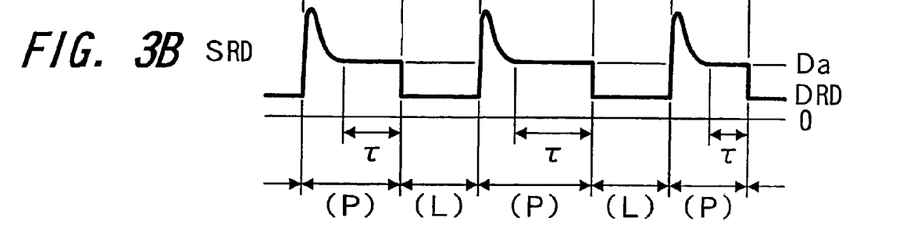

At a time of actual recording, since the recording signal SWRT varies continuously between the low "0" level and the high "1" level and the pulse width TW of this recording signal varies in response to the recorded contents as shown in FIG. 3A, for example, the output signal SRD also varies in response to the recording signal SWRT as shown in FIG. 3B.

In this case, if the recording signal is recorded on the disk normally, then the variation characteristics of the reflected laser beam LREF during the period ranging from the time ts to the time ta are nearly constant. Thus, even when the pulse width TW of the recording signal SWRT varies, the duration of the period ranging from the time ts to the time ta is nearly constant. Then, the pulse width TW of the recording signal SWRT varies in response to the recorded contents. Therefore, the period τ (=period ranging from the time ta to the time te) at the constant level varies in response to the contents of the recording signal SWRT.

When a CD-R in which a recording signal has been recorded normally is played back the dye layer of the disk at its portion corresponding to the period TW (in particular, the period τ) is deformed and hence the amount of light of the reflected laser beam LREF is decreased accordingly. Consequently, as illustrated and also shown in FIG. 3, the portion corresponding to the period TW is formed as a pit (P). Because the dye layer of the remaining portion is not deformed, the amount of light of the reflected laser beam LREF is large and hence the remaining portion is formed as a land (L). That is, when the recording signal SWRT is held at high level "1", the pits are formed.

Figure 4A:
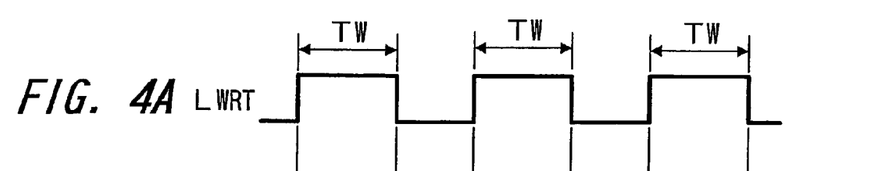
FIG. 4 is a diagram of waveforms explaining the present invention.
Figure 4B:
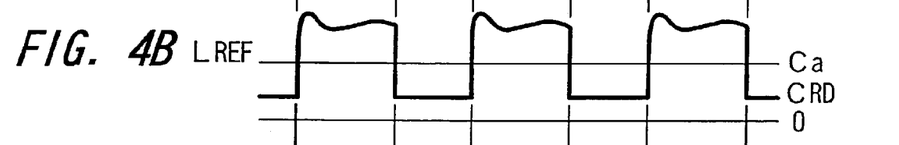
Figure 4C:
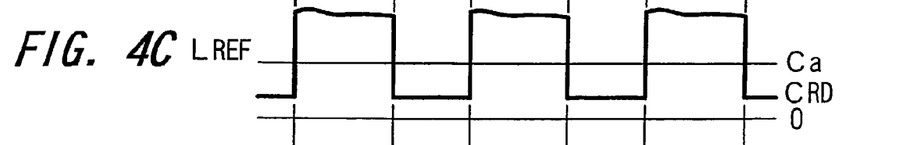
Figure 4D:
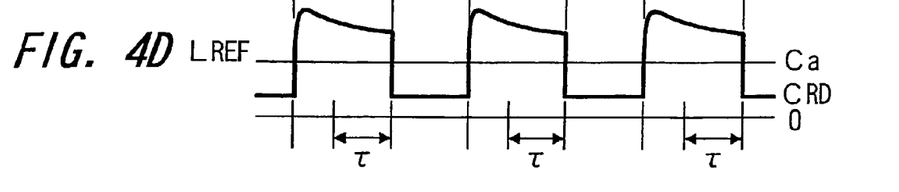

So far we have described the case in which the recording signal is recorded on the disk normally. When the irradiated laser beam LIRR is not properly focused or the tracking is displaced due to the vibrations of the disk, the irradiated point on the dye layer does not produce intensive heat sufficiently and this irradiated point cannot be deformed satisfactorily. As a consequence, the amount of light of the reflected laser beam LREF varies as shown in FIGS. 4B, 4C or FIG. 4D so that it can be prevented from being lowered to the original amount of light Ca. Therefore, the output signal SRD from the optical head varies as does the amount of light shown in FIGS. 4B, 4C or FIG. 4D and can be prevented from being lowered to the original level Da.

Although the amount of light of the reflected laser light LREF is decreased a little when the irradiated laser beam LIRR is not properly focused, the decreased amount of light of this reflected laser beam is considerably small as compared with the case in which the amount of light of the reflected laser beam is decreased due to the existence of the pits and this decreased amount of light is made negligible.

According to the present invention, having noticed the fact that the output signal SRD outputted from the optical head upon recording varies as described above when the recording signal is recorded normally on the disk or the recording signal is not recorded normally on the disk, there are provided a recording apparatus and a recording method by which the fact that the irradiated laser beam LIRR is not properly focused or that the tracking is displaced due to the vibrations of the disk or the optical pickup can be directly detected from the output signal SRD.

An example in which the present invention is applied to a recording and reproducing apparatus using a CD-R as a recording medium will hereinafter be described with reference to FIG. 1.

Figure 1:
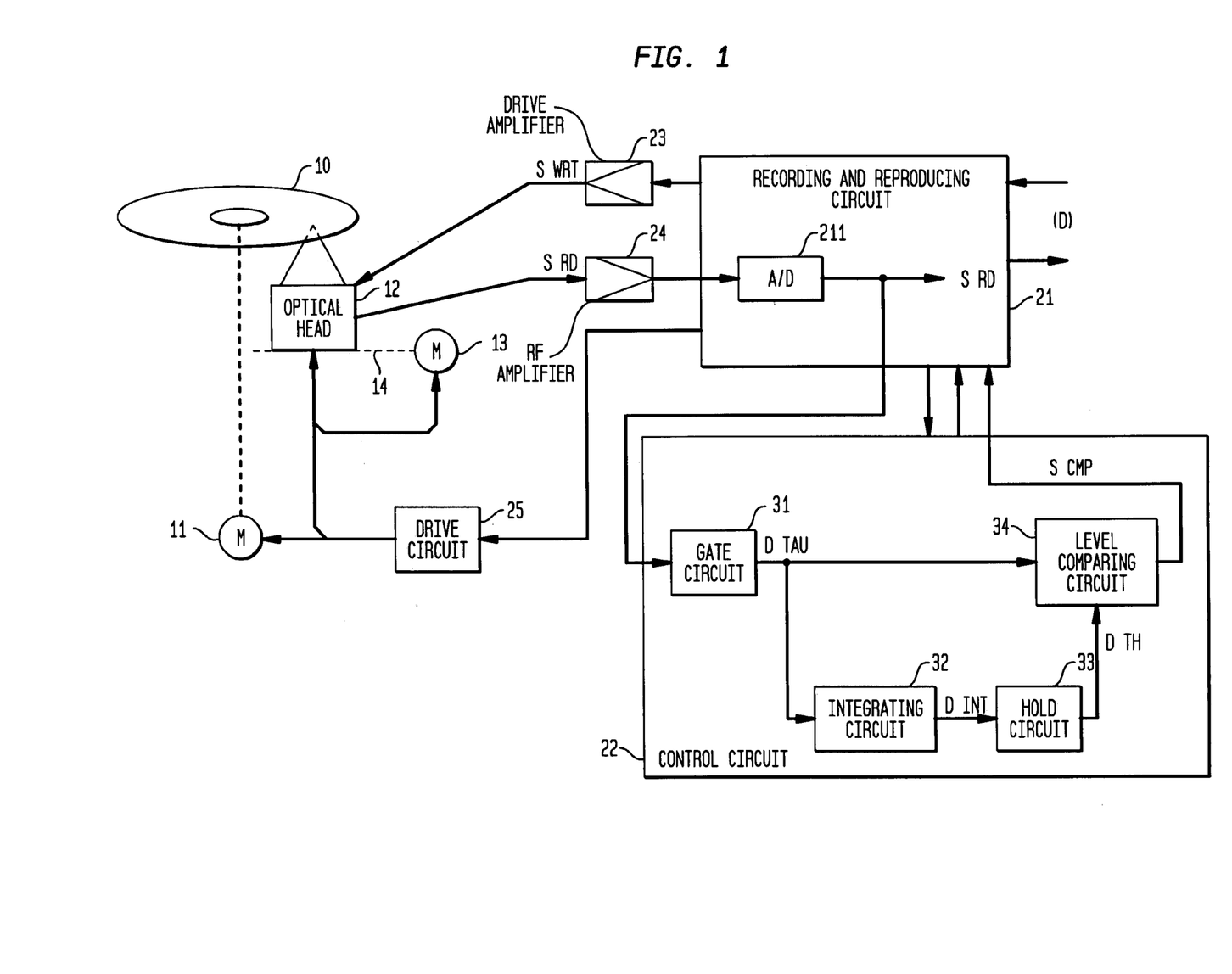
FIG. 1 is a block diagram showing a recording apparatus (recording and reproducing apparatus) according to an embodiment of the present invention.

Referring to FIG. 1, there is provided a CD-R 10. This CD-R 10 is rotated at predetermined velocity by a spindle motor 11. An optical head (optical pickup) 12 is disposed in an opposing relation to the signal recording surface of the CD-R 10. This optical head 12 can be moved along the radius direction of the CD-R 10 by a sled motor 13 and a sled shaft 14.

In this case, the optical head 12 is adapted to irradiate the laser beam LIRR on the CD-R 10 and to receive the reflected laser beam LREF from the disk. To this end, although not shown, this optical head includes a laser diode for converting the recording signal SWRT to provide the irradiated laser beam LIRR, a photodiode for receiving the reflected laser beam LREF and converting this reflected laser beam to provide the output signal SRD and optical systems for the laser beams LIRR, LREF. Further, this optical head 12 includes mechanisms for properly focusing and tracking the laser beams IRRR, LREF.

There is shown a recording and reproducing circuit 21. In this embodiment, this recording and reproducing circuit 21 is comprised of an IC called a "CD-R processor". Upon recording, this recording and reproducing circuit 21 converts digital data to be recorded to provide an EFM signal, i.e., the recording signals SWRT by effecting a variety of encode processings on recorded digital data (D) such as digital audio data. Further, upon reproducing, the recording and reproducing circuit 21 outputs the original data (D) by effecting a decode processing, which is a processing complementary to that in the recording mode, on the output signal SRD obtained from the optical head 12.

Furthermore, the recording and reproducing circuit 21 forms and outputs servo signals for effecting a variety of servo control operations upon recording and reproducing. In this embodiment, the recording and reproducing circuit 21 includes an A/D converter circuit 211 for converting the output signal SRD into the digital signal SRD in the form of an analog-to-digital signal.

There is shown a control circuit 22. This control circuit 22 is comprised of a microcomputer, for example, and is adapted to control various items, such as the entire operation of this recording and reproducing apparatus or the tracking positions of the optical head 12 required upon recording and reproducing.

Then, upon recording, the digital data (D) is supplied to the recording and reproducing circuit 21 and thereby converted into the recording signal SWRT. This recording signal SWRT is supplied through a drive amplifier 23 to the optical head 12 and thereby converted into the irradiated laser beam LIRR. This irradiated laser beam LIRR is irradiated on the CD-R 10 and thereby a recording signal is recorded on this disk.

At that time, the reflected laser beam LREF from the CD-R 10 is received by the optical head 12 and thereby outputted as the output signal SRD. This output signal SRD is supplied through an RF amplifier 24 to the A/D converter circuit 211 in the recording and reproducing circuit 21 and thereby converted into the digital signal SRD in the form of an analog to digital signal.

Then, further, the recording and reproducing circuit 21 forms a variety of servo signals from the digital signal SRD, and these servo signals are supplied to a drive circuit 25. Of these servo signals, a spindle servo signal is supplied to the spindle motor 11 and thereby a rotational speed of the spindle motor is controlled. Thus, the linear velocities at the recording/reproducing positions of the CD-R 10 can be made constant.

A focusing servo signal is outputted from the drive circuit 25. This focusing servo signal is supplied to the optical head 12 and thereby the irradiated laser beam LIRR can be properly focused under focus-servo-control. Further, a sled servo signal and a tracking servo signal are outputted from the drive circuit 25. These sled servo signal and tracking servo signal are supplied to the sled motor 13 and the optical head 12 and thereby the irradiated laser beam LIRR can be sled-servo controlled and tracking-servo controlled.

On the other hand, upon reproducing, the output signal SRD of the optical head 12 is supplied to the recording and reproducing circuit 21 and thereby the above-mentioned servo-control-operations can be executed. Then, the recording and reproducing circuit 21 outputs the original digital data (D) by effecting a reproducing decode processing on the output signal SRD from the A/D converter circuit 211.

Then, according to the present invention, in order to prevent the irradiated laser beam LIRR from being focused improperly and to prevent the tracking position from being displaced due to the above-mentioned vibrations upon recording, the recording and reproducing apparatus is further constructed as follows.

Specifically, as shown in FIG. 2, for example, since the recording signal SWRT is formed by the recording and reproducing circuit 21, the recording and reproducing circuit 21 can learn the leading edge time ts and the trailing edge time te of the recording signal SWRT. Further, since the period ranging from the time ts to the time ta is nearly made constant, the recording and reproducing circuit 21 can learn the starting time ta of the flat period $\tau$. Therefore, the recording and reproducing circuit 21 can learn the time position of this flat period $\tau$. Then, the control circuit 22 can learn the time position of this flat period $\tau$.

To this end, the recording and reproducing apparatus shown in FIG. 1 is provided with a gate circuit 31, an integrating circuit 32, a hold circuit 33 and a level comparing circuit 34. In the case of the recording and reproducing apparatus shown in FIG. 1, however, these circuits 31 to 34 may be realized by the microcomputer comprising the control circuit 22 and software that may be executed by the microcomputer. FIG. 1 shows the circuits 31 to 34 thus realized from a hardware standpoint equivalently.

Then, upon recording, the digital output signal SRD from the A/D converter circuit 211 is supplied to the gate circuit 31 and the flat period T of the digital output signal SRD is supplied from the recording and reproducing circuit 21 to the microcomputer 22. Accordingly, a value DTAU of the flat period $\tau$ of the signal SRD is outputted from the gate circuit 31 in synchronism with each of the flat periods $\tau$. This value DTAU is compared with a reference value DTH in level by the level comparing circuit 34.

In a method of forming this reference value DTH, as will be described later on, when a recording signal is recorded on the disk normally (for example, in the case of FIG. 3), the value DTAU of the signal SRD of the flat period $\tau$ becomes equal to a value Da. When the irradiated laser beam LIRR is not properly focused and the tracking is displaced due to the vibrations (for example, in the case of FIG. 4), the value DTAU of the signal SRS in the period $\tau$ becomes larger than the value Da.

Thus, we have the following equality:

$$DTH = Da + \Delta D$$

In this equation, $\Delta D$ represents the predetermined allowable error. Then, the level comparing circuit 34 outputs in every flat period $\tau$ a compared output signal SCMP which goes to low "0" level when an inequality of DTAU≦DTH is satisfied (for example, in the case of FIG. 3) and which goes to high "1" level when an inequality of DTAU>DTH is satisfied (for example, in the case of FIG. 4). This compared output signal SCMP is supplied to the recording and reproducing circuit 21 as a control signal for permitting/inhibiting the recording. When an equality of SCMP="0" is satisfied, for example, the recording on the CD-R 10 may be permitted. When an equality of SCMP="1" is satisfied, the recording on the CD-R 10 may be inhibited. When the equality of SCMP="0" is satisfied after the recording is inhibited, the recording may be resumed from the signal SWRT obtained at the time in which the recording is inhibited.

The manner in which the reference value DTH of the level comparing circuit 34 is formed by the recording and reproducing apparatus shown in FIG. 1 will be described below.

Specifically, when the recording is started, the value DTAU of the flat period $\tau$ of the digital output signal SRD is outputted from the gate circuit 31 in every period $\tau$ over one to several frame periods. This value DTAU is supplied to and integrated by the integrating circuit 32, and an integrated value DINT is held by the hold circuit 33.

In this case, the value DINT is an average value of the flat period $\tau$ in one to several frame periods. Then when one to several frame periods are averaged, the influences of noises produced by dusts or scratches are made negligible. Accordingly, the value DINT held by the hold circuit 33 may be corrected by only the magnitude of the allowable error $\Delta D$ and supplied to the comparing circuit 34 as the reference value DTH, in which it may be used to compare the two levels as described above.

In this manner, according to the above-mentioned recording and reproducing apparatus, when the irradiated laser beam LIRR is not properly focused and the tracking is displaced due to the vibrations, such defocused state and displacement of the tracking can be detected. Then, in this case, according to the present invention, since it is detected by checking the amount of light of the reflected laser beam LREF in the flat period $\tau$ whether or not the pits are formed in actual practice, even vibrations which exert bad influences on the recording but cannot be detected by other detecting means and other detection methods can be detected. Moreover, it is possible to prevent even vibrations, which cannot exert bad influences on the recording, from being detected erroneously by other detecting means and other detection methods.

Further, since it is detected whether or not the pits are formed in actual practice, a failure of the recording due to the vibrations can be detected. Moreover, even when the recording is failed due to an abnormality of the CD-R 10, such failure of the recording can be detected. Therefore, it is possible to prevent a trouble in which the recording is not made normally while a user misunderstands the state of the recording as if the recording were made successfully.

In addition, since the recording and reproducing apparatus for recording and reproducing the CD-R includes the function to measure the amount of light of the reflected laser beam LREF in order to effect the focusing servo and the tracking servo upon recording, new assemblies need not be added to this recording and reproducing apparatus. Therefore, the influence of the vibrations can be detected without increasing the manufacturing costs of the recording and reproducing apparatus.

Since the amount of light of the reflected laser beam LREF during the flat period $\tau$ upon recording is detected based upon the amount of light of the reflected laser beam LREF of the flat period $\tau$ in one to several frame periods required when the recording is started, the recording and reproducing apparatus according to the present invention can be protected from being affected by the influences exerted by the scattering of the CD-R 10.

Further, although the recording is interrupted immediately after the compared output signal SCMP goes to high "1" level as described above, if a track address obtained when this compared output signal SCMP goes to high "1" level is stored, then at the end of the recording, it is possible to confirm the recorded results of the stored track address with ease.

While the equivalent gate circuit 31 is assumed as described above, if the A/D converter circuit 211 is controlled in such a manner that the A/D converter circuit 211 may convert the analog signal into the digital signal only during the flat period $\tau$ of the output signal SRD, then the gate circuit 31 can be omitted. While the disk on which the recording signal is recorded by using the laser beam is the CD-R 10 as described above, the present invention is not limited thereto and the above-mentioned disk may be other suitable media such as a DVD-RAM.

[List of Abbreviations in this Specification]
A/D: Analog to Digital
CD: Compact Disc
CD-R: CD Recordable
DVD: Digital Versatile Disc
DVD-RAM: DVD Random Access Memory
EFM: Eight to Fourteen Modulation
IC: Integrated Circuit
RF: Radio Frequency According to the present invention, when the irradiated laser beam is not properly focused and the tracking is displaced due to the vibrations, such defocused state and the displacement of the tracking can be detected. In particular, even vibrations which exert a bad influence on the recording but cannot be detected by other detecting means and other detection methods can be detected. Moreover, it is possible to prevent vibrations, which cannot exert a bad influence on the recording, from being detected erroneously by other detecting means and other detection method.

Further, since it is detected whether or not the pits are formed in actual practice, a failure of the recording due to the vibrations can be detected. Moreover, even when the recording is failed due to an abnormality of the disk, such failure of the recording can be detected. Therefore, it is possible to prevent a user from misunderstanding a failed recording as a successful recording.

LIST OF REFERENCE NUMERALS AND ITEMS

10 . . . the CD-R
11 . . . the spindle motor
12 . . . the optical head
13 . . . the sled motor
14 . . . the sled shaft
21 . . . the recording and reproducing circuit
22 . . . the control circuit
23 . . . the drive amplifier
24 . . . the RF amplifier
25 . . . the drive circuit
31 . . . the gate circuit
32 . . . the integrating circuit
33 . . . the hold circuit
34 . . . the level comparing circuit
211 . . . the A/D converter circuit

What is claimed is:

1. A recording apparatus for recording a signal on a disk by irradiating a laser beam on said disk, the recording apparatus comprising:
an optical head having a photodiode for receiving a reflected laser beam obtained when said laser beam is irradiated on said disk;
a gate circuit to which a signal outputted from said optical head is supplied;
a level comparing circuit for comparing a value of an output signal from said gate circuit with a reference value, wherein upon recording, said gate circuit is controlled in synchronism with said signal to be recorded in such a manner that it may output a signal of a first predetermined period from output signals to be supplied from said optical head to said gate circuit as said output signal and an output signal of said level comparing circuit is outputted as detected results of vibrations of said disk or vibrations of a light source for outputting said laser beam;
an integrating circuit for integrating a value of the output signal of said gate circuit over a second predetermined period when the recording is started; and
a hold circuit for holding an integrated result of said integrating circuit and wherein a hold output of said hold circuit is supplied to said level comparing circuit as said reference value.

2. A method for recording a signal on a disk by irradiating a laser beam on said disk, said method comprising the steps of:
receiving a reflected laser beam obtained when said laser beam is irradiated on said disk by use of an optical head having a photodiode;
supplying a signal outputted from said optical head to a gate circuit;
comparing a value of an output signal from said gate circuit with a reference value by use of a level comparing circuit, wherein upon recording, said gate circuit is controlled in synchronism with said signal to be recorded in such a manner that it may output a signal of a first predetermined period from output signals to be supplied from said optical head to said gate circuit as said output signal and an output signal of said level comparing circuit is outputted as detected results of vibrations of said disk or vibrations of a light source for outputting said laser beam;
integrating a value of the output signal of said gate circuit by use of an integrating circuit over a second predetermined period when the recording is started; and
holding an integrated result of said integrating circuit by use of a hold circuit, wherein a hold output of said hold circuit is supplied to said level comparing circuit as said reference value.

3. A recording apparatus for recording a signal on a disk by irradiating a laser beam on said disk, the recording apparatus comprising:
means for receiving a reflected laser beam obtained when said laser beam is irradiated on said disk and for producing a signal indicative thereof;
means for receiving the produced signal and for processing the same so as to provide a processed signal;
a level comparing circuit operable to compare a value of the processed signal with a reference value and operable to produce a comparison signal therefrom, wherein said comparison signal provides an indication of detected vibrations of said disk or of a light source for supplying said laser beam;
an integrating circuit operable to integrate a value of the processed signal over a period; and
a hold circuit operable to hold an integrated result of said integrating circuit, wherein an output of said hold circuit is supplied to said level comparing circuit as said reference value.

4. A method for recording a signal on a disk by irradiating a laser beam on said disk, the method comprising the steps of:
receiving a reflected laser beam obtained when said laser beam is irradiated on said disk and producing a signal indicative thereof;

receiving the produced signal and processing the same so as to provide a processed signal;

comparing a value of the processed signal with a reference value and producing a comparison signal therefrom by use of a level comparing circuit, wherein said comparison signal provides an indication of detected vibrations of said disk or of a light source for supplying said laser beam;

integrating a value of the processed signal over a period by use of an integrating circuit; and holding an integrated result of said integrating circuit by use of a hold circuit, wherein an output of said hold circuit is supplied to said level comparing circuit as said reference value.

* * * * *